(12) United States Patent
Shum et al.

(10) Patent No.: US 7,966,474 B2
(45) Date of Patent: Jun. 21, 2011

(54) SYSTEM, METHOD AND COMPUTER PROGRAM PRODUCT FOR TRANSLATING STORAGE ELEMENTS

(75) Inventors: Chung-Lung Kevin Shum, Wappingers Falls, NY (US); Fadi Y. Busaba, Poughkeepsie, NY (US); Mark S. Farrell, Pleasant Valley, NY (US); Bruce C Giamei, Poughkeepsie, NY (US); Bernd Nerz, Boeblingen (DE); David A. Schroter, Round Rock, TX (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 12/036,520

(22) Filed: Feb. 25, 2008

(65) Prior Publication Data
US 2009/0217009 A1 Aug. 27, 2009

(51) Int. Cl.
*G06F 9/26* (2006.01)
(52) U.S. Cl. .......... 711/220; 711/221; 712/211; 341/51; 341/90
(58) Field of Classification Search .................. 711/220
See application file for complete search history.

(56) References Cited

U.S. PATENT DOCUMENTS

| | | | |
|---|---|---|---|
| 4,556,951 A * | 12/1985 | Dickman et al. | 712/223 |
| 5,388,234 A * | 2/1995 | Kanno et al. | 711/220 |
| 5,517,664 A | 5/1996 | Watanabe et al. | |
| 5,680,568 A * | 10/1997 | Sakamura | 711/220 |
| 5,684,975 A * | 11/1997 | Duvalsaint et al. | 711/203 |
| 5,713,001 A * | 1/1998 | Eberhard et al. | 711/216 |
| 5,748,951 A | 5/1998 | Webb et al. | |
| 5,790,844 A | 8/1998 | Webb et al. | |
| 5,951,676 A | 9/1999 | Henry et al. | |
| 6,058,470 A | 5/2000 | Webb et al. | |
| 6,067,617 A | 5/2000 | Webb et al. | |
| 6,204,782 B1 * | 3/2001 | Gonzalez et al. | 341/90 |
| 6,313,767 B1 * | 11/2001 | Ishizuka et al. | 341/67 |
| 2002/0170012 A1 * | 11/2002 | Ernst et al. | 714/743 |
| 2003/0018879 A1 * | 1/2003 | Sahraoui et al. | 712/1 |
| 2007/0075879 A1 * | 4/2007 | Salwan et al. | 341/51 |

OTHER PUBLICATIONS

"IBM® z/Architecture Principles of Operation", Publication No. SA22-7832-05, 6th Edition, Apr. 2007. 1,215 pages separated into 4 electronic attachements.

* cited by examiner

*Primary Examiner* — Kaushikkumar Patel
(74) *Attorney, Agent, or Firm* — Cantor Colburn LLP; John Campbell

(57) ABSTRACT

A system, method and computer program product for translations in a computer system. The system includes a general purpose register containing a base address of an address translation table. The system also includes a millicode accessible special displacement register configured to receive a plurality of elements to be translated. The system further includes a multiplexer for selecting a particular one of the plurality of elements from the millicode accessible special displacement register and for generating a displacement or offset value. The system further includes an address generator for creating a combined address containing the base address from the general purpose register and the generated displacement or offset value.

16 Claims, 2 Drawing Sheets

SYSTEM, METHOD AND COMPUTER PROGRAM PRODUCT FOR TRANSLATING STORAGE ELEMENTS

BACKGROUND OF THE INVENTION

This invention relates generally to translating information, and more particularly to translating information in a computer storage unit from one form to another.

Many modern computer applications require translation of information from one format to another. For instance, a computer may need to translate a particular webpage from one language to another.

Translation of contents from one form to another usually requires software code to implement the translation. In some computers, translate instructions (TR) may allow software to map a range from a particular memory location from one character value scheme to another character value scheme based on a prearranged mapping table which may be maintained in memory.

Prior art systems and methods typically make use of either specialized hardware to process the entire translate instruction or, in a millicode capable system, specialized millicode instruction routines may be used to implement such an instruction.

As the instruction set for high-end processors has evolved over the years, more and more complex instructions and features have been added to the architecture. Conceptually more straightforward instructions, such as loads, stores, moves, branches, and logical and arithmetic instructions, can be implemented directly by the hardware. The more complex instructions and features, such as I/O instructions, Start Interpretive Execution (SIE), cross-memory instructions, interruption handlers, resets, and certain RAS (reliability, availability, and serviceability) features, are typically implemented with some type of internal code. One form of such code internal to the central processor (CP) is called millicode, which can implement complex instructions by utilizing preexisting dataflow and hardware controlled execution units of a pipelined processor.

The use of a special coprocessor, e.g., a hardware engine, to perform the mapping from one character value scheme to another character value scheme based on a prearranged mapping table may include time delays related to starting of the hardware engine and potential sub-optimized caching of the mapping table.

In millicode capable systems, millicode assist instructions have been provided as means of assisting millicode to do the character conversion but may require multiplexing of an index register input to the particular address generator. The address generator may be the most critical path in microprocessor design and multiplexing thereof may slow down the particular microprocessor.

It would be beneficial to remove the necessity of specialized hardware engines and to provide a new set of specialized millicode assist instructions to allow a more efficient character mapping as required for TR instructions.

BRIEF SUMMARY OF THE INVENTION

An exemplary embodiment is directed to a system for performing translations in a computer system. The system includes a general purpose register containing a base address of an address translation table. The system also includes a millicode accessible special displacement register configured to receive a plurality of elements to be translated. The system further includes a multiplexer for selecting a particular one of the plurality of elements from the millicode accessible special displacement register and for generating a displacement or offset value. The system further includes an address generator for creating a combined address containing the base address from the general purpose register and the generated displacement or offset value.

Another exemplary embodiment is directed to a method of creating a translation table access instruction. The method includes loading a millicode accessible special displacement register with a plurality of elements to be translated. A particular one of the plurality of elements is selected from the millicode accessible special displacement register. A displacement or offset value is generated for the particular element. The selecting and generating are performed by a multiplexer. A combined address containing a base address of an address translation table located in a general purpose register and the generated displacement or offset value is created by an address generator.

A further exemplary embodiment is directed to a computer program product for creating a translation table access instruction. The computer program product includes a computer-readable storage medium for storing instructions for creating a translation table access instruction comprising a method. The method includes loading a millicode accessible special displacement register with a plurality of elements to be translated. A particular one of the plurality of elements is selected from the millicode accessible special displacement register. A displacement or offset value is generated for the particular element. The selecting and generating are performed by a multiplexer. A combined address containing a base address of an address translation table located in a general purpose register and the generated displacement or offset value is created by an address generator.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Embodiments of the present invention are directed to systems and methods that utilize millicode assists which allow for efficient storage of character mapping as may be required for translate (TR) instructions. In one embodiment, an Address Generation Unit (AGU) includes two sets of millicode accessible registers, called special displacement registers (SDR) for the millicode to write values from any general-purpose register (GPR). Once the SDRs are loaded, a new dataflow structure is provided to allow contents of these special displacement registers to be multiplexed down to be used as the displacement component of an operand access address generation. Alternatively, the SDR can also be loaded directly from local data cache memory (L1).

A general-purpose microprocessor may include data flow to update general-purpose registers (GPR) from local data cache memory (L1) and then form cache access addresses from the GPRs.

To implement a typical TR instruction as an example, the operations may include a hardware or software (millicode) loop to fetch a target element X from a memory location A. The value of X may then be added to the base address of a translation mapping table B and the contents of the memory location at B+X for the mapped result is element Y. This value may then be stored in another designated destination storage location C.

This loop continues to fetch the next element after X (i.e., X+1) at the next sequential memory location A+1 (if each element is one byte,) and repeat the lookup via the new increment address into the translation mapping table, and then the storage update to the next position C+1 (if each mapped element is also one byte) until the range to be mapped endpoint is reached. Note that the size of source element can be different than the size of the mapped element.

Figure 1:
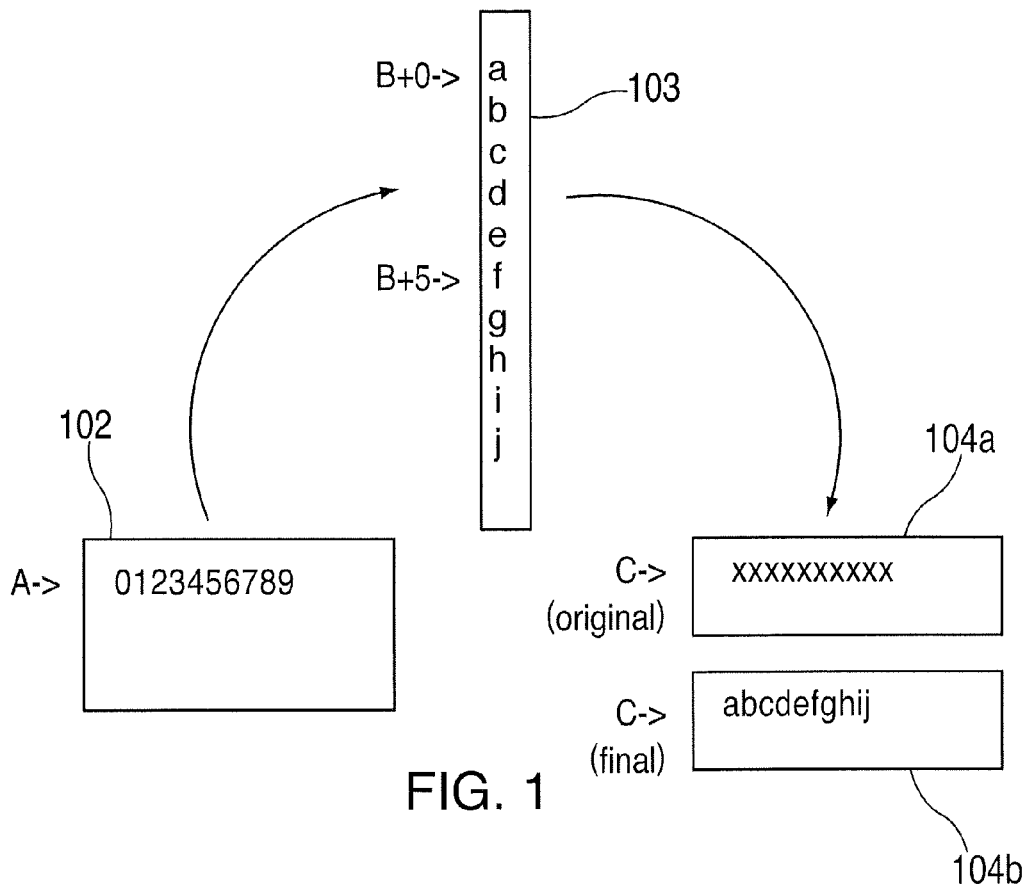
FIG. 1 depicts a flow diagram of a transformation of a character from one format to another.

FIG. 1 is a flow diagram showing an example of translating a character from one format to another. In particular, this simplified example depicts how a number may be translated into a particular letter of the alphabet. It should be understood, however, that the present invention is not limited to translating a particular number to a particular letter. Rather, the present invention may be utilized to translate any information in a first format into a second format. In one embodiment, each element to be translated is a value that may be added to the base address of a memory map to look up the translation for a particular element.

Information to be translated may be stored in a first memory location 102 (also referred to as memory location A). To translate the information stored in the first memory location, the offset of the first element within the location (in this case, denoted by the numeral X) is selected. This offset is then added to the base address of a translation mapping table 103 and having a base address of B. The information contained in translation mapping table 103 at the offset determined by the contents of byte X from memory location A 102 is fetched and then stored in a second memory location 104 (e.g., at the base address of the second memory location plus X). As shown, the second memory location 104 has two instances, an initial instance 104a representing the contents of the second memory location 104 before a translation and a final instance 104b representing the contents of the second memory location 104 after a translation. The x's shown in the first instance 104a denote that the location may be of any initial values. Of course, in some instances, the values in second memory location 104 may be the result of prior operations that will be overwritten.

As an example, and as shown in FIG. 1, translating the first character in the first memory location 102 will result in an offset of zero being selected. This offset will cause the hardware performing the translation to enter the translation mapping table 103 at a location B+0 and result in the selection of the letter "a". The letter a is then stored in the first position in the second memory location 104. As another example, on the sixth iteration of the translation (each step having taken a successive memory location within the first memory location 102), the index of the element (5) is selected causing the selection of the letter f (located at B+5) from the translation memory map 103 to be stored in the sixth location of the second memory location 104. In this example, each element is considered to be represented in one byte of memory to simplify the illustration.

The process just described requires that each element contained in the first memory location 102 be individually fetched. A straight forward millicode implementation of such an instruction requires multiple memory accesses by using a instruction "loop", that fetches an element from the first memory location 102, then fetches the corresponding translation memory map 103, so to store into the second memory location 104, be repeated for each element of the first memory location 102.

Aspects of the present invention may allow for faster execution time of a process of translating information according to the example described in relation to FIG. 1. In some embodiments this may be achieved by reducing both the number of loops required and removing potential operand address generation interlock delays that may exist if the system is operated as previously described. Such address interlock delays occur when a operand cache data is required to be fetched prior to calculating the next operand access address as in the case of forming the access address to the translation memory map 103 based on an element value of the source element. In one embodiment, the reduction in the number of iterations (and thus memory accesses) may be accomplished by loading 8 bytes from the first memory location 102 into a register upon the processing of a TR command. In some embodiments, the 8 bytes (64 bits) may represent 8 characters to be translated, and thus 8 offsets to the translation map table 103. These 8 bytes may then be added into a general register (a base register), having the base address of the translation map table 103, with an instruction as the offset location used to look up the translation.

As is well known in the art, the processor may include an address generation unit (AGU). An AGU performs the effective address calculations needed to address data operands in memory and may include registers used to generate the addresses. Such a unit typically is responsible for performing the address generations required for accessing memory (or local cache) during the translation operations previously described in relation to FIG. 1. Such address generation usually involves the addition of the values of a base register and a displacement as defined by an instruction known to those skilled in the art. In one embodiment, the address generation may involve a further addition of the value of an index register. Both base and index registers are selected from the GPRs.

Figure 2:
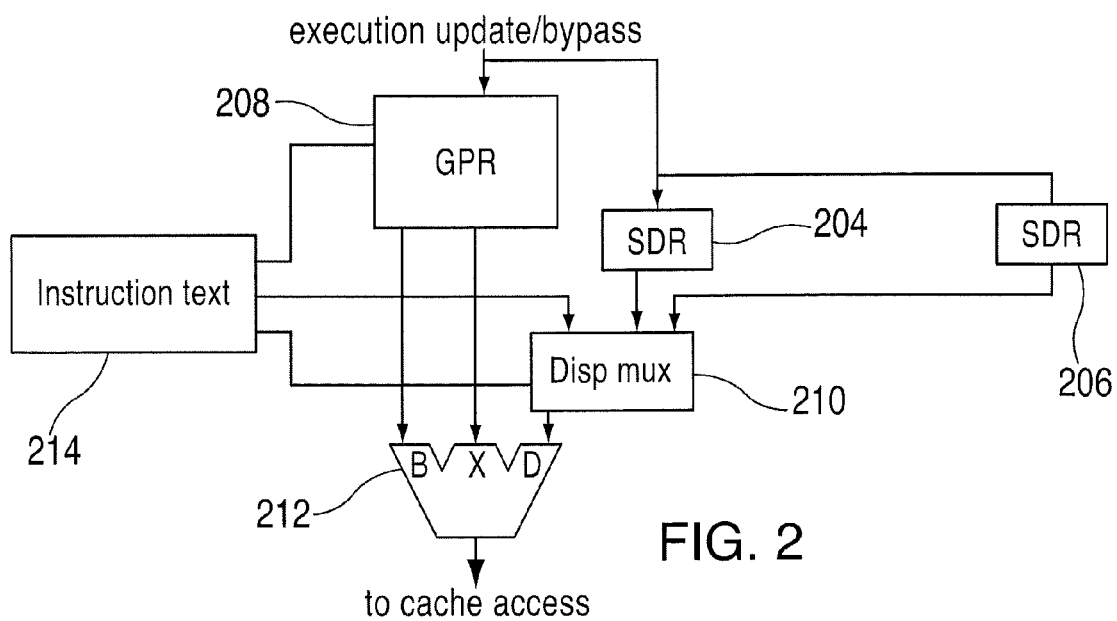
FIG. 2 depicts a block diagram of a portion of an address generation unit according to an embodiment of the present invention.

FIG. 2 shows an example of a portion of an AGU 202 according to an embodiment of the present invention. Two sets of millicode accessible registers 204 and 206, called special displacement registers (SDRs), are provided. The SDRs are written by millicode through execution updates, usually by reading a GPR that has been previously loaded from cache. Alternatively, the SDRs can also be written through execution updates that have directly obtained data from cache. Two SDRs are described in an embodiment herein, however one SDR or three of more SDRs may also be implemented by alternate embodiments. As shown, a new dataflow structure is incorporated into a typical AGU that includes a 3-way adder 212 to provide calculation of operand access to cache by summing the values of a base, an index and a displacement as defined for the current instruction. The added structure is provided to allow contents of these SDRs 204 and 206 to be multiplexed by the multiplexer 210 to be used as the displacement component of a memory location access (indicated as the output of the address creator 212).

In this embodiment, the address location of the memory map 103 location to be accessed is created by reusing the existing 3-way address adder 212.

A set of hardware instructions, available only for millicode usage, called "Insert Character Under Mask using special displacement registers" may be utilized in order to multiplex an offset value from a SDR to be used as the displacement component of an operand access address generation to obtain a target element within a translation mapping table having a base register already loaded with the starting table address. In general, these instructions allow one byte or two bytes from the target translation mapping table at location 103 to be inserted into part of the GPR. That is, the offset value can be directly utilized from the SDR to form a cache access address into the translation memory map 103 (represented as the output of the address creator 212) without having to either load such offset into an index register, or in a design not supporting an index register, specifically adding the table base value and the offset into another base register. While the nature of the instructions is described in greater detail below, the usage of the AGU 202 shown in FIG. 2 in a millicode routine may be shown in FIG. 3.

Figure 3:
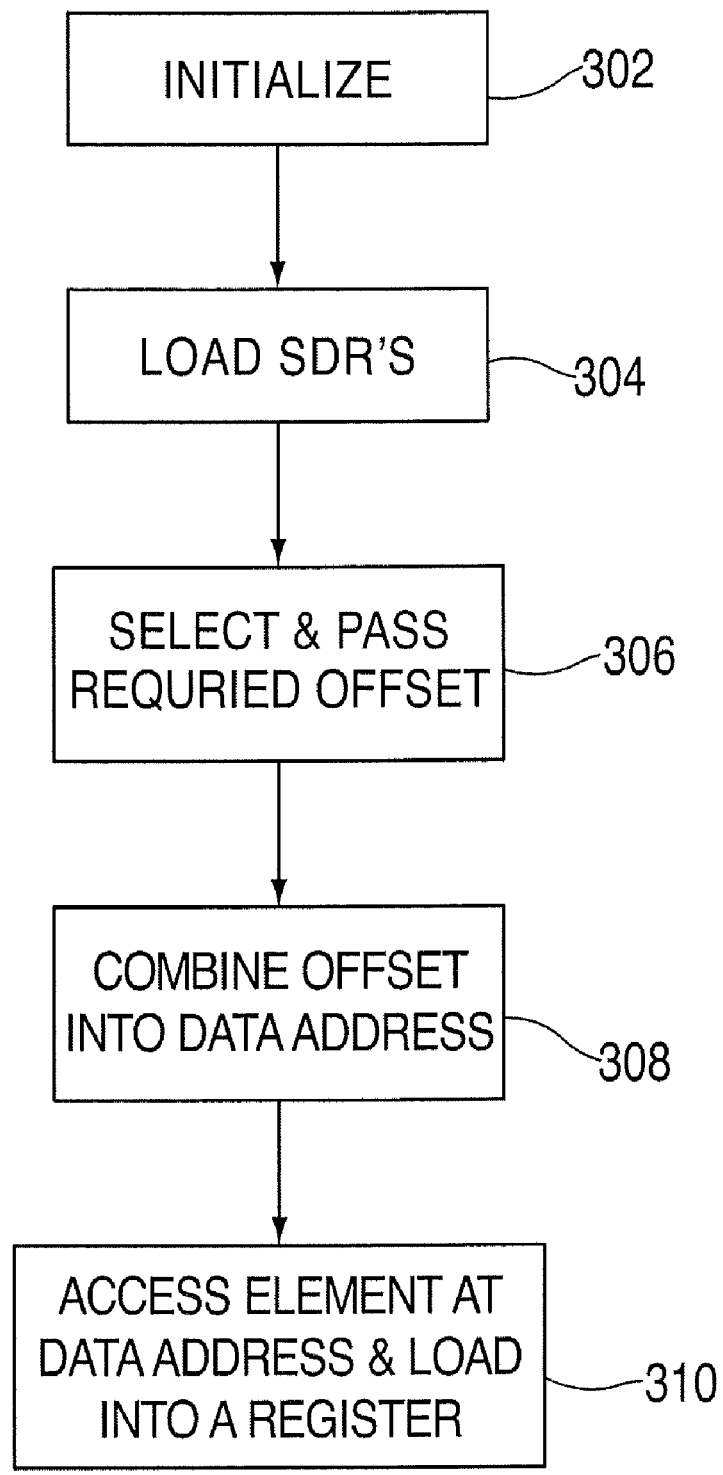
FIG. 3 depicts a method of creating an address for selection of a character transform utilizing a transform map according to an embodiment of the present invention.

FIG. 3 shows a simplified method by which a key step of looking up the translation mapping table for multiple elements in order to perform a translation instruction may be streamlined according to the present invention. The following explanation of the process shown in FIG. 3 refers to elements shown in FIG. 2.

Upon the execution of a TR instruction, a millicode code routine is entered as part of a normal process for a system that is millicode capable. The initialization and running of a millicode is known in the art. A key portion of this routine is the repeating process of looking up each element in location 102, locating the mapped element in 103, and then updating the corresponding element in location 104 (not shown). Such millicode segment first initializes base registers pointing to starting location 102, 103 and 104 at block 302. Then in block 304, two consecutive 64 bits (8 bytes) of the source characters (which are also the offsets to the translation mapping table themselves) to be translated will be loaded into the two SDR's 204 and 206. As one of ordinary skill in the art will readily realize, the instructions that cause the information to be loaded may be included in and issued from the instruction text block 214. Such loading may be a direct load from cache data, or by first loading the cache data into a GPR and then loading a GPR into the SDR involving one or more instructions. Furthermore, the instruction text block 214 may include the information to the multiplexer 210 for selecting portions of the SDR's to be packed into the GPR 208 as discussed below.

A simplified process can now be used to access multiple elements in the translation mapping table without acquiring much processing delays. The multiple source elements in SDR's 204 and 206 can now be multiplexed by the multiplexer 210 to select the appropriate element (character) currently being translated and form the corresponding offset for accessing the mapped element (character) based on the information from instruction text block 214. The multiplexer 210 then passes the offset to the address generator 212 in block 306. The offset selected (D) is then combined with base address (B) of the translation memory map 103 while keeping the unused index (X) input to 0, by the address generator 212 in block 308. Such address can now be used to access the mapped element from the cache, and be loaded into a GPR accordingly in block 310.

The simplified process just described will now be described in greater detail with respect to the "Insert Characters Under Mask Using Special Displacement Registers" millicode instruction format shown in Table 1.

TABLE 1

| ICSHO | $R_1, M3, D_2(B_2)$ | [RSY] | | | | | |
|---|---|---|---|---|---|---|---|
| 'EB' | | R1 | M3 | B2 | D2 | '00' | 'E2' |
| 0 | | 7 8 11 | 12 15 | 16 19 | 20 31 | 32 39 | 40 47 |

| ICSLO | $R_1, M3, D_2(B_2)$ | [RSY] | | | | | |
|---|---|---|---|---|---|---|---|
| 'EB' | | R1 | M3 | B2 | D2 | '00' | 'E0' |
| 0 | | 7 8 11 | 12 15 | 16 | 20 31 | 32 39 | 40 47 |

| ICSHT | $R_1, M3, D_2(B_2)$ | [RSY] | | | | | |
|---|---|---|---|---|---|---|---|
| 'EB' | | R1 | M3 | B2 | D2 | '00' | 'E3' |
| 0 | | 7 8 11 | 12 15 | 16 19 | 20 31 | 32 39 | 40 47 |

| ICSLT | $R_1, M3, D_2(B_2)$ | [RSY] | | | | | |
|---|---|---|---|---|---|---|---|
| 'EB' | | R1 | M3 | B2 | D2 | '00' | 'E1' |
| 0 | | 7 8 11 | 12 15 | 16 19 | 20 31 | 32 39 | 40 47 |

The specific instructions utilizing the instruction format shown in Table 1 include ICSHO, ICSHT, ICSLO, and ICSLT. In general, these instructions allow the offset to be selected being one or two bytes, and also allow one or two bytes from the memory location calculated to be inserted into part of a GPR. Such provisions facilitate a translation of source elements being one or two bytes into mapped elements being one or two bytes.

The fifth character of the instruction mneumonic indicates whether one byte (O) or two bytes (T) of R1 are to be placed in the GPR as indicated by the R1 field.

The memory location calculated, or operand address, is generated by adding the base GPR indicated by B2 (the GPR used as base) with the displacement field multiplexed from the SDRs. The multiplexing is selected by the displacement field D2 of the instruction, where D2 bit 0 selects the first SDR 204 versus the second SDR 206 and D2 bits 4:11 indicate what bytes of the selected SDR are to be picked as the displacement value.

For example, D2 (0)=0, and D2 4:11=00000001 will pick byte 8 of SDR1 as the displacement field. Due to the fact that two bytes from the cache may be selected in the case of the instructions ICSHT and ICSLT the multiplexer 210 may also include a shifter (not shown) to effectively multiply the value that the displacement field selected by 2.

After the memory is accessed, the GPR indicated by the R1 field will be updated according to the M3 field and the last two characters in the instruction mneumonic. When the fourth character of the instruction mneumonic is H or L it indicates the upper half or lower half of R1 to be updated. When upper half (H) and one byte (O) is selected the bits 0,1,2 or 3 of the M3 field will indicate whether R1(0:7), R1(8:15), R1(16:23), R1(24:31) is to be updated. When the lower half (L) and one byte (O) is selected, the bits 0, 1, 2 or 3 of the M3 field will indicate whether R1 (32:39), R1 (40:47), R1 ( 48:55), R1 (56:63) will be updated. It is expected that only one of the bits in the M3 field will be set. When two bytes (T) is selected, then the M3 field of "1100" or "0011" will update R1 (0:15) or R1 (16:31) when the upper half is selected; or will update R1 (32:47) or R1 (48:63) when the lower half is selected.

Additionally, the condition code setting can be defined for whether an access exception is detected. Millicode is responsible for checking the condition code and responding to its value for correct architectural implementation if an access exception is encountered. Furthermore, such condition code setting can be defined as accumulating such that millicode only need to inspect after a stream of such instructions. In this case, millicode is responsible for resetting the millicode condition code (CC) prior to using this instruction to avoid any ambiguous CC values being propagated by this instruction.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system configured for performing translations in a computer system comprising:
a general purpose register containing a base address of an address translation table;
millicode accessible special displacement registers configured to receive a plurality of elements to be translated;
a multiplexer configured for selecting a particular one of the plurality of elements from the millicode accessible special displacement registers and generating a displacement or offset value;
an address generator configured for creating a combined address containing the base address from the general purpose register and the generated displacement or offset value; and
an instruction text block in communication with the general purpose register, the multiplexer and the address generator;
wherein the instruction text block is configured to execute a set of insert character under mask using special displacement register instructions using the general purpose register, the multiplexer and the address generator.

2. The system of claim 1, wherein the insert character under mask using special displacement register instructions include a base register field indicating the general purpose register, and both a displacement field and a field indicative of a destination address for the addressed storage element.

3. The system of claim 2, wherein a particular byte or bytes of the destination address can be specified.

4. The system of claim 1, wherein the multiplexer includes means for doubling the offset value.

5. A method of creating a translation table access instruction comprising:
loading millicode accessible special displacement registers with a plurality of elements to be translated;
selecting a particular one of the plurality of elements from the millicode accessible special displacement registers;
generating a displacement or offset value for the particular element, the selecting and generating is performed by a multiplexer; creating a combined address containing a base address of an address translation table located in a general purpose register and the generated displacement or offset value, the creating is performed by an address generator; and
receiving an insert character under mask using special displacement register instruction from an instruction text block in communication with the general purpose register and the multiplexer.

6. The method of claim 5, wherein the insert character under mask using special displacement register instruction includes a base register field indicating the general purpose register containing a base address of an address translation table, and both a displacement field and a field indicative a destination address for a translated element.

7. The method of claim 6, wherein the destination address addresses the general purpose register.

8. The method of claim 5, wherein the selecting includes determining whether one or two bytes will be selected.

9. The method of claim 5, wherein a particular byte or bytes can be obtained from the combined address and written into a destination address.

10. The method of claim 5 wherein the multiplexer includes means for doubling the offset value.

11. A computer program product configured for creating a translation table access instruction, the computer program product comprising:
a computer-readable storage medium configured for storing instructions for creating the translation table access instruction comprising a method of:
loading millicode accessible special displacement registers with a plurality of elements to be translated;
selecting a particular one of the plurality of elements from the millicode accessible special displacement registers;
generating a displacement or offset value for the particular element, the selecting and generating performed by a multiplexer;
generating a combined address containing a base address of an address translation table located in a general purpose register and the generated displacement or offset value, the creating performed by an address generator; and
receiving an insert character under mask using special displacement register instruction from an instruction text block in communication with the general purpose register and the multiplexer.

12. The computer program product of claim 11, wherein the insert character under mask using special displacement register instruction includes a base register field indicating the general purpose register containing a base address of an address translation table, and both a displacement field and a field indicative a destination address for a translated element.

13. The computer program product of 12, wherein the destination address addresses the general purpose register.

14. The computer program product of 11, wherein the selecting includes determining whether one or two bytes will be selected.

15. The computer program product of claim 11, wherein a particular byte or bytes can be obtained from the combined address and written into a destination address.

16. The computer program product of claim 11 wherein the multiplexer includes means for doubling the offset value.

* * * * *